United States Patent
Noth et al.

(10) Patent No.: US 9,820,496 B2
(45) Date of Patent: Nov. 21, 2017

(54) BEVERAGE MACHINE FOR PREPARING AND DISPENSING ICED BEVERAGES

(71) Applicant: NESTEC S.A., Vevey (CH)

(72) Inventors: Andre Noth, Pully (CH); Youcef Ait Bouziad, Echandens (CH); Alfred Yoakim, St-legier-la Chiesaz (CH)

(73) Assignee: Nestec S.A., Vevey (CH)

( * ) Notice: Subject to any disclaimer, the term of this patent is extended or adjusted under 35 U.S.C. 154(b) by 56 days.

(21) Appl. No.: 14/439,729

(22) PCT Filed: Oct. 29, 2013

(86) PCT No.: PCT/EP2013/072543
§ 371 (c)(1),
(2) Date: Apr. 30, 2015

(87) PCT Pub. No.: WO2014/067913
PCT Pub. Date: May 8, 2014

(65) Prior Publication Data
US 2015/0289539 A1    Oct. 15, 2015

(30) Foreign Application Priority Data

Oct. 30, 2012  (EP) .................... 12190591

(51) Int. Cl.
*B67D 7/14*        (2010.01)
*A23G 9/28*        (2006.01)
(Continued)

(52) U.S. Cl.
CPC ............ *A23G 9/28* (2013.01); *A23G 9/045* (2013.01); *A23G 9/22* (2013.01); *A23G 9/224* (2013.01);
(Continued)

(58) Field of Classification Search
CPC ........ A23G 9/227; A23G 9/224; A23G 9/045; A23G 9/08; A23G 9/106; A23G 9/12; A23G 9/22; B67D 1/0004; B67D 1/0009; B67D 1/0043; B67D 1/0862; B67D 1/0871; B67D 1/0857; B67D 1/108; B01F 7/00458; B01F 7/00466; B01F 7/00633; B01F 7/26; B01F 7/00
(Continued)

(56) References Cited

U.S. PATENT DOCUMENTS 3,359,748 A * 12/1967 Booth .................... A23G 9/045
222/144.5
3,477,244 A * 11/1969 Scoggins ............... A23G 9/045
62/306

(Continued)

FOREIGN PATENT DOCUMENTS

WO    2005047171    5/2005

*Primary Examiner* — Lien Ngo
(74) *Attorney, Agent, or Firm* — K&L Gates LLP

(57) ABSTRACT

The present invention provides a beverage machine with at least three distinct zones 1, 3, 4. A first zone 1 for storing a liquid or semi-liquid product at ambient temperature, a second zone 3 for processing the stored product, in particular for cooling the product to a predetermined serving temperature, and a third zone 4 for storing the cooled product and maintaining it at the predetermined serving temperature. From the third zone 4 an iced beverage can be dispensed.

3 Claims, 6 Drawing Sheets

(51) Int. Cl.
*A23G 9/04* (2006.01)
*A23G 9/22* (2006.01)
*B67D 1/00* (2006.01)
*B67D 1/08* (2006.01)
*B67D 1/10* (2006.01)
*B01F 7/00* (2006.01)
*B01F 7/26* (2006.01)
*B01F 15/06* (2006.01)

(52) U.S. Cl.
CPC ............... *A23G 9/228* (2013.01); *B01F 7/00* (2013.01); *B01F 7/00458* (2013.01); *B01F 7/00466* (2013.01); *B01F 7/00633* (2013.01); *B01F 7/26* (2013.01); *B01F 15/06* (2013.01); *B01F 15/066* (2013.01); *B67D 1/0004* (2013.01); *B67D 1/0009* (2013.01); *B67D 1/0043* (2013.01); *B67D 1/0857* (2013.01); *B67D 1/0862* (2013.01); *B67D 1/0871* (2013.01); *B67D 1/108* (2013.01); *B01F 2015/061* (2013.01); *B01F 2215/0021* (2013.01); *B01F 2215/0022* (2013.01)

(58) Field of Classification Search
USPC ............... 222/56, 129.1–129.4, 146.1, 146.6
See application file for complete search history.

(56) References Cited

U.S. PATENT DOCUMENTS

| | | | | |
|---|---|---|---|---|
| 3,479,835 | A | * | 11/1969 | Lane ................... G07F 17/0071 62/135 |
| 3,533,537 | A | * | 10/1970 | Hazlewood ............ A23G 9/045 222/146.1 |
| 4,463,572 | A | * | 8/1984 | Brown, Jr. ............... A23G 9/12 366/144 |
| 4,507,054 | A | * | 3/1985 | Schoenmeyr ........... F04B 49/24 417/12 |
| 4,625,525 | A | | 12/1986 | Bradbury et al. |
| 5,205,129 | A | * | 4/1993 | Wright ................... A23G 9/163 62/136 |
| 5,433,084 | A | * | 7/1995 | Kaiser ................. A23G 3/0221 261/140.1 |
| 5,713,209 | A | * | 2/1998 | Hunchar .................. A23G 9/12 366/301 |
| 5,916,248 | A | * | 6/1999 | Bravo .................... A23G 9/163 426/519 |
| 6,350,484 | B1 | * | 2/2002 | Ault ........................ A23F 5/243 426/573 |

\* cited by examiner

BEVERAGE MACHINE FOR PREPARING AND DISPENSING ICED BEVERAGES

CROSS REFERENCE TO RELATED APPLICATIONS

The present application is a National Stage of International Application No. PCT/EP2013/072543, filed on Oct. 29, 2013, which claims priority to European Patent Application No. 12190591.3, filed on Oct. 30, 2012, the entire contents of which are being incorporated herein by reference.

The present invention is directed to a beverage dispensing machine and a method for preparing and dispensing iced beverages. In particular, the machine of the present invention is composed of three distinct product zones for storing, cooling, and dispensing an iced beverage.

Iced beverage dispensing machines are becoming more and more popular. For the preparation of iced beverages, typically a liquid or semi-liquid product is maintained in large quantities in a tank or reservoir of the beverage machine, wherein the product is being stirred and cooled to a desired serving temperature. Several serving portions can then be dispensed rapidly at the serving temperature, which is typically below 0° C. so that the product is partially frozen, the rest being liquid or semi-liquid.

In prior art, two concepts are currently used to bring the liquid or semi-liquid product to the desired serving temperature.

The first concept is to start with a frozen product (i.e. having a temperature at around −25° C. to −18° C.), which is usually purchased in a pouch. The pouch is left at ambient temperature for a certain amount of time, so that the temperature of the frozen product increases to the desired serving temperature (approximately −7° C.), before it is poured into the beverage machine. The serving of portions of the liquid or semi-liquid product as iced beverages can then start immediately. However, the first concept has the drawbacks that it firstly requires a frozen supply chain, which is expensive, and that secondly the certain amount of time for increasing the temperature of the frozen product can reach up to two hours, which delays the preparation of beverages or needs perfect planning and anticipation. Thirdly, the initial product is not shelf-stable, if not frozen.

The second concept is to start with a shelf-stable product that is poured into the beverage machine at ambient temperature. The shelf-stable product is either already purchased in its final liquid or semi-liquid form or in a concentrated liquid or powder form, to which water, milk or cream is added. The product is then stirred and cooled to the desired serving temperature in the beverage machine. Due to the typically large amount of the product, the cooling requires a large amount of time, during which serving of beverages is yet not possible. The freezing of the large amount of product also consumes a fair amount of power.

Additionally, both concepts have the disadvantage that the product comes in contact with a large number of parts of the beverage machine (e.g. a stirrer, tanks, or a dispenser), which all have to be cleaned.

US 2002/0033401 A1 discloses a cold beverage dispensing system for chilling a beverage. The system comprises two zones, namely a beverage hopper for retaining a quantity of beverage and for chilling the beverage, and a refill assembly for controllably refilling beverage into the beverage hopper. That means cooling and storage of the cooled beverage are both carried out in the same zone. The system has the drawback that when the beverage hopper is refilled from the refill assembly, the beverage temperature increases. Therefore, the beverage is not always at the ideal serving temperature.

US 2008/0023486 A1 discloses a similar system with two zones, namely a reservoir for storing and cooling a beverage, and a refill assembly. Before refilling beverage into the reservoir, the volumetric freezing rate for the beverage is determined. The rate, with which the reservoir is refilled, is then controlled to be no faster than the volumetric freezing rate. Still the temperature in the reservoir will increase.

The present invention has the object to improve the known state of the art, in particular by overcoming the above-mentioned drawbacks. The present invention has the specific object to enable the use of a shelf-stable initial product, while having a much reduced beverage preparation time. Further, the present invention desires to have no waiting time, before liquid or semi-liquid product can be filled into the machine. Further, the present invention has the object to reduce the volume and the number of parts that have to be cleaned. Finally, an object of the present invention is to reduce the power consumption.

The concept for achieving the above-mentioned objects is to provide a beverage dispensing machine that is composed of at least three distinct zones:

A first zone, in which the product is stored
A second zone, in which the product is processed
A third zone, in which a defined number of serving portions of the processed product are maintained so as to be ready to be served.

In the first zone, the product is stored in an unprocessed or unfrozen state, for example at ambient temperature.

The objects of the present invention are specifically achieved according to the attached independent claims. The attached dependent claims develop further advantages of the present invention.

The present invention is in particular directed to a beverage machine for preparing and dispensing iced beverages made of a liquid or semi-liquid product, wherein the beverage machine comprises a first zone for storing said product at ambient temperature, a second zone for receiving a portion of the product stored in the first zone and for cooling said portion of the product from ambient temperature to a predetermined serving temperature, and a third zone for receiving the cooled portion of the product from the second zone and for storing the product at the predetermined serving temperature.

The first zone is a section, where the liquid or semi-liquid product enters initially into the beverage machine.

The second zone is a section of the beverage machine, in which said product is processed. In particular, the product is cooled to the desired predetermined serving temperature. However, the product can also be aerated or mixed with a second product or can be processed otherwise. For cooling, the product is preferably brought into contact with a cooled or frozen surface. Preferably, the product is stirred continuously or in intervals, in order to homogenize the cooling process. Two different processing executions for cooling the product are envisaged by the present invention, either a discrete or a continuous processing of the product. The two aspects will be described further below.

The beverage machine according to the present invention has the advantages that a shelf-stable initial product is usable, the beverage preparation time is largely reduced, no initial waiting time for unfreezing the product is required, a reduced volume and a lower number of parts have to be cleaned, and the power consumption is reduced.

Due to the fact that the first zone is at ambient temperature and the second zone is employed for cooling, the use of a shelf-stable product, which does not have to be frozen, is possible. Thus, also no frozen supply chain, and particularly no waiting time for at least partially unfreezing a frozen product is necessary. The beverage preparation time is reduced, since only a portion of the product in the second zone has to be cooled, rather than the entire amount of the product. Thereby, also the power consumption is reduced. Moreover, the product in the third zone can be kept constantly at the predetermined desired serving temperature, since no liquid or semi-liquid product that has at ambient temperature ever enters the third zone.

Preferably, the beverage machine further comprises a pump, preferably a peristaltic pump, for delivering the portion of the product from the first zone to the second zone.

The pump is configured to deliver a precise quantity of the product into the second zone. The precise control allows for an efficient beverage preparation.

Preferably, the first zone is a flexible or semi-flexible aseptic pouch.

The pouch can be disposed when empty. Therefore, less volume and fewer parts have to be cleaned. The product in the first zone has a longer lifetime. The output of the pouch is preferably a flexible tube, which can easily be connected to and detached from the pump.

Preferably, the second zone comprises a first stirrer for stirring the portion of the product and a first cooled surface for cooling the portion of the product to the predetermined serving temperature, and the third zone comprises a second stirrer for stirring the product and a second cooled surface for maintaining the product at the predetermined serving temperature.

With the above configuration the cooling of the product works efficiently. In particular, the transmission of the cold temperature from the cooled surfaces to the liquid or semi-liquid product can be homogenized by rotating the stirrers. Further, any amount of product, which freezes on the cooled surfaces, can be scraped off by the stirrers.

Preferably, the first and second stirrers are driven by an electromagnetic motor, the first and second cooled surfaces are connected to a cooling circuit, and the electromagnetic motor and the cooling circuit are placed in a separated fourth zone.

By ensuring that the above-mentioned components do not come into contact with the liquid or semi-liquid product, firstly a cleaning of said components is not necessary, and secondly the temperature of the product is not increased by heat, which is generated by said components.

Preferably, the first and second cooled surfaces form a cooling cylinder, which passes through the second zone and the third zone, respectively.

The cooling cylinder realizes the cooled surfaces in the second and third zone in an easy to install and compact manner.

Preferably, the cooling cylinder comprises an evaporator tube for circulating a cooling gas.

The cooling gas allows efficient cooling of the cooling cylinder, which can be well regulated by means of the cooling circuit.

Preferably, the second zone comprises a storage chamber having a volume smaller than the volume of a storage chamber of the first zone, preferably equal to one beverage serving portion.

Since only one serving portion is cooled to the predetermined serving temperature at the same time, the waiting time for a frozen beverage to be dispensed is largely reduced. Further, the power consumption is smaller. The second zone has moreover less volume that has to be cleaned.

Preferably, the third zone comprises a storage chamber having a volume smaller than the volume of the storage chamber of the first zone and larger than the volume of the storage chamber of the second zone, preferably equal to several beverage serving portions.

The specific volume of the storage chamber ensures that a certain amount of beverage serving portions is always ready in the third zone, so that the machine is always able to dispense a certain amount of beverage portions without any delay. Since only a reduced volume has to be maintained at low temperatures, the energy consumption of the beverage machine is reduced compared to machines where a storage zone containing all of the product stocked in the machine has to be maintained at a low temperature.

Preferably, the third zone further comprises a dispenser for dispensing a beverage serving portion of the cooled product as the iced beverage, and a level sensor for determining a filling level of the product in the third zone.

The level sensor enables an automatic refilling of the third zone with the cooled product from the second zone, which can be controlled by a control unit of the beverage machine. Thus, the beverage machine virtually never runs out of beverage serving portions that can be dispensed.

In a first aspect of the invention, the first and second stirrers each have at least one opening, and for at least one predetermined relative orientation between the first stirrer and the second stirrer, the at least one opening of the first stirrer overlaps with the at least one opening of the second stirrer, in order to allow transfer of the product from the second zone to the third zone.

The above arrangement of the stirrers allows a simple transfer mechanism of the product, without the need of additional valves or pumps. Further, the first aspect of the present invention allows to realize a discrete cooling procedure.

Preferably, the second stirrer comprises at least one mechanical stop, which protrudes through the at least one opening of the first stirrer, if the first stirrer is rotated clockwise, the at least one mechanical stop is blocked on a first side of the at least one opening of the first stirrer, so that the first and second stirrers have a relative orientation to each other, in which the at least one opening of the first stirrer completely overlaps with the at least one opening of the second stirrer, and if the first stirrer is rotated counter-clockwise, the at least one mechanical stop is blocked on a second side of the at least one opening of the first stirrer, so that the first and second stirrers have a relative orientation to each other, in which the at least one opening of the first stirrer does not overlap with the at least one opening of the second stirrer.

The rotating direction of the first stirrer is enough to open and close the transfer path for the product from the second zone to the third zone. Thus, a simple but efficient transfer mechanism is provided.

In a second aspect of the invention, the first stirrer is a rotating screw for progressively passing the portion of the product through the second zone, and the second stirrer has at least one opening to allow a transfer of the product from the second zone to the third zone.

The second aspect of the present invention allows realizing a continuous cooling procedure.

Preferably, a cooling power of the first cooled surface, a flow rate of the product through the second zone, and a rotational speed of the rotating screw are set such that the product is cooled to the predetermined serving temperature when it has reached the bottom of the second zone.

By adapting the above mentioned parameters, the energy consumption can be optimized, while ensuring that the temperature of the product stored in the third zone is never increased from the predetermined serving temperature.

The present invention is further directed to a method for preparing and dispensing iced beverages made of a liquid or semi-liquid product, wherein the method comprises the steps of storing said product at ambient temperature in a first zone, cooling a portion of the product received from the first zone from ambient temperature to a predetermined serving temperature in a second zone, and storing the cooled portion of the product received from the second zone at the predetermined serving temperature in a third zone.

Preferably, the method further comprises the steps of determining a filling level of the product in the third zone, in case the filling level is below a predetermined threshold, transferring the portion of the product from the first zone to the second zone, stirring and cooling the portion of the product to the predetermined serving temperature using predetermined process settings in the second zone, and in case the filling level is at or above the predetermined threshold, maintaining the cooled product in the third zone at the predetermined serving temperature by stirring and cooling using predetermined standard settings.

Preferably, the method further comprises the steps of, in case the filling level is below the predetermined threshold, monitoring the temperature of the product in the second zone, transferring the product from the second zone to the third zone, if the monitored temperature has reached the predetermined serving temperature.

The method according to the present invention has the same advantages as mentioned for the beverage machine, namely that a shelf-stable initial product can be used, that a beverage preparation time is reduced, that no initial waiting time is required, that a reduced volume and fewer parts have to be cleaned, and that the power consumption can be reduced.

The present invention is now explained in more detail in respect to the attached drawings.

BRIEF DESCRIPTION OF THE FIGURES

FIG. 1 shows schematically the beverage machine according to the present invention. The beverage machine has a first zone 1, which is preferably a flexible or semi-flexible aseptic pouch that is filled with a liquid or semi-liquid product suitable for making an iced beverage. Said product can for example be coffee, tea, milk, juice, syrup, water or the like. The pouch is preferably made of a material that can be disposed and recycled, e.g. plastic or a fabric. However, the first zone 1 can also be formed by some other container or reservoir, e.g. a reservoir made of glass or metal, which has a first storage chamber that is suited to store the liquid or semi-liquid product. The product in the first zone 1 is stored at ambient temperature, which is preferably between 20° C. and 25° C.

Figure 1:
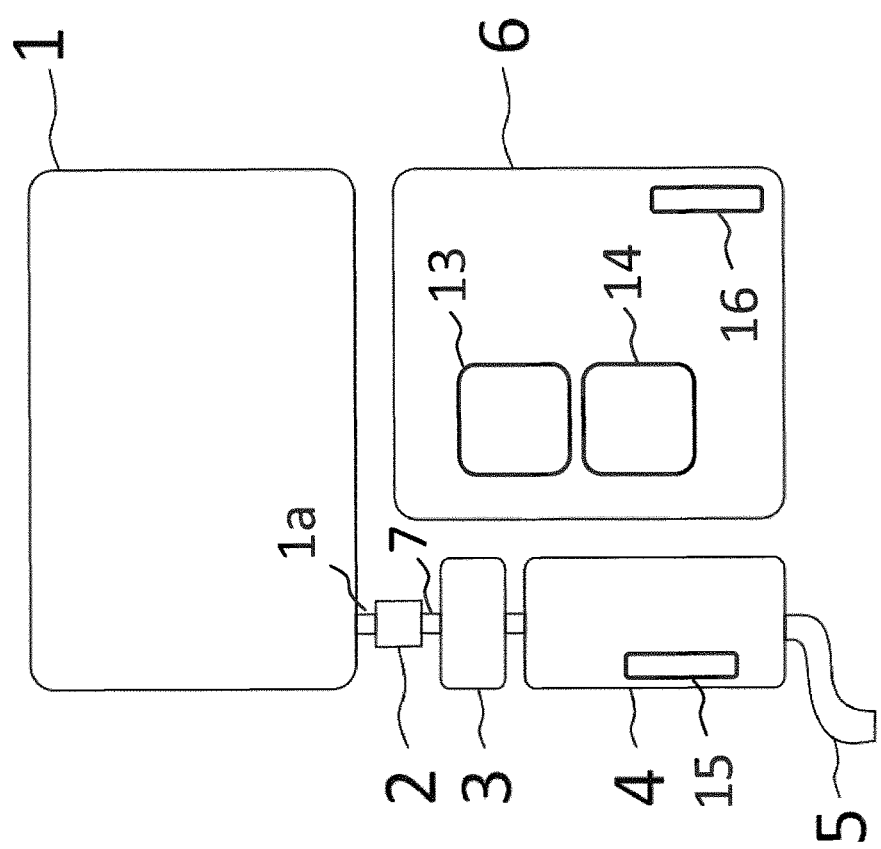
FIG. 1 shows a schematic diagram of a beverage machine according to the present invention.

Via the first zone 1 the liquid or semi-liquid product is inserted into the beverage machine. Therefore, an output of the pouch is preferably a flexible tube 1a. The flexible tube 1a can be connected to an input of pump 2 of the beverage machine. The pump 2 is suited to deliver a precise quantity of the liquid or semi-liquid product from the first zone 1 via a conduct 7 to the second zone 3. The pump 2 can be controlled manually by a user or automatically by a control unit 16 of the beverage machine, which is e.g. a microprocessor. The pump is preferably a peristaltic pump, but could also be any other pump like a rotating pump.

The second zone 3 is a processing zone, preferably within a housing of the beverage machine. The second zone 3 preferably has a storage chamber or a reservoir with a volume that is about the volume of one beverage serving portion, wherein the beverage serving portion is the amount of beverage that is dispensed from the beverage machine in response to a request for one beverage. At least the volume of this second storage chamber is smaller than the volume of the first storage chamber (e.g. the pouch) of the first zone 1. The second zone 3 receives the liquid or semi-liquid product that is transferred by the pump 2 from the first zone 1, and comprises means for stirring 10 (cf. FIG. 2) and means for cooling 8a the portion of the liquid product from ambient temperature to a predetermined serving temperature. The predetermined serving temperature is preferably lower than 0° C., more preferably between 0° C. and −15° C., and even more preferably between −4° C. and −10° C. The second zone 3 is preferably insulated to the outside of the machine.

The second zone 3 is mainly for cooling the product, but can be also used for aerating the product or mixing the product with another product that could e.g. be inserted via a second pump. The second zone 3 can also be used as mixing chamber, e.g. if the liquid or semi-liquid product is water, and has in this case an inlet for a powdered product or the like.

The cooling means 8a and the stirring means 10 of the second zone 3 are respectively operated by an electromagnetic motor 13 and a cooling circuit 14, which are both preferably disposed in a fourth zone 6 of the beverage machine. The fourth zone 6 is separated from the other zones 1, 3, 4, i.e. no fluid connection exists so that liquid or semi-liquid product cannot enter the fourth zone 6.

From the second zone 3 a portion of the liquid or semi-liquid product, which has been cooled to the predetermined serving temperature (and optionally processed otherwise), can be transferred to the third zone 4. The third zone 4 has a storage chamber having a larger volume than the storage chamber of the second zone 3, but the storage chamber has a smaller volume than the storage chamber of the first zone 1 (e.g. the pouch). Preferably the third zone 4 includes a storage chamber having a volume of several serving portions, preferably 5-20, more preferably 10-15 serving portions. The third zone 4 is preferably insulated to the outside of the beverage machine, and includes stirring means 11 and cooling means 8b, which are respectively operated by the electromagnetic motor 13 and the cooling circuit 14.

The third zone 4 is used for storing the cooled liquid or semi-liquid product, and in particular for maintaining the cooled product at the predetermined serving temperature while also maintaining a defined texture and overrun, so that the machine is always ready to dispense an iced beverage.

The third zone 4 thus has dispensing means 5 for dispensing a beverage serving portion of the cooled product as the iced beverage e.g. into a cup or glass. Additionally, the third zone 4 preferably has a level sensor 5 for measuring the filling level of the cooled product in the third zone 4. The level sensor 5 can be a sensor that works intrusively or non-intrusively in respect to the cooled product. For example, a sensor emitting and detecting ultrasonic waves or light rays can be used to measure the filling level. Also other means known from the prior art are possible. The sensor 5 is preferably connected to the control unit 16. The control unit 16 can thus automatically initiate a transfer of the liquid or semi-liquid product from the second zone 3 to the third zone 4, e.g. in case the monitored filling level falls below a predetermined threshold value.

According to different aspects of the beverage machine of the present invention, the cooling of the liquid or semi-liquid product can either be carried out as a discrete process or as a continuous process.

Figure 2:
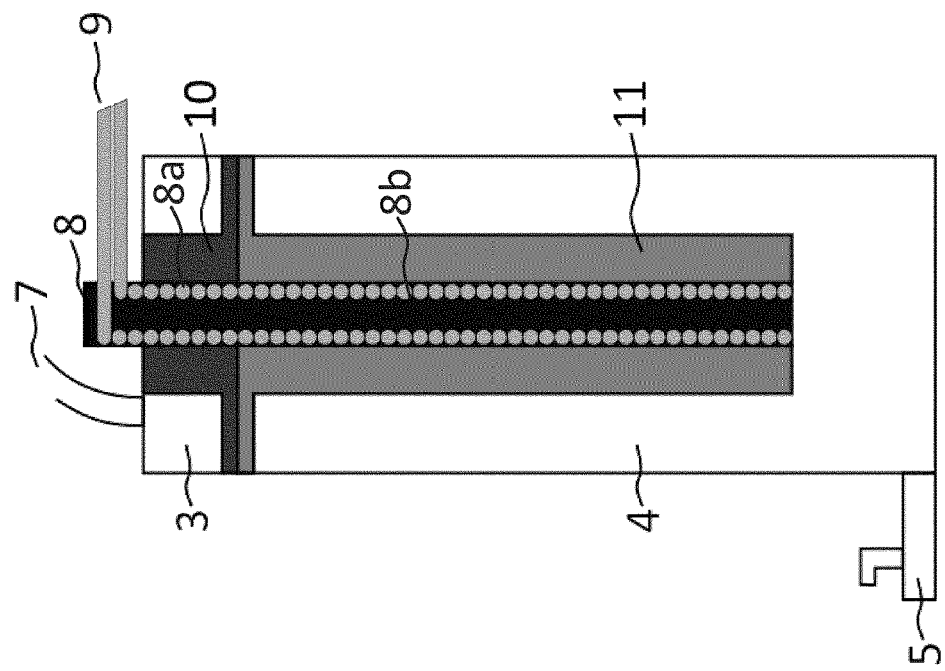
FIG. 2 shows a beverage machine according to the first aspect of the present invention.

FIG. 2 shows a part of a beverage machine suitable for discrete processing according to a first aspect of the present invention. In particular, the second zone 3 is shown, into which the liquid or semi-liquid product can be transferred via the conduit 7 and the pump 2. The second zone 3 is formed as a storage chamber that includes within a first stirrer 10 and a first cooled surface 8a.

The first stirrer 10 is preferably designed as a rotatable disc 10b, which is provided with at least one wing-like structure 10c that protrudes vertically from the disc 10b and is suited to move the liquid or semi-liquid product, when the disc 10b is rotating. The protrusion height of the wing-like 10c structure is adapted to the height of the storage chamber of the second zone 3.

The cooled surface 8a is preferably the surface of a cooling cylinder 8, through which preferably a cooling gas is circulated. The cooling gas is circulated though an evaporator tube 9 that runs through the cooling cylinder 8. The cooling cylinder 8 preferably also enters the third zone 4, so that it passes as one piece, preferably vertically, through both the second zone 3 and the third zone 4.

The third zone 4 is formed as a storage chamber that includes within the second cooled surface 8b of the cooling cylinder 8 and a second stirrer 11, which is preferably designed similar to the first stirrer 10, but is disposed upside down to the first stirrer 10. The third zone 4 is also connected to the dispenser 5, which can be opened and closed for dispensing a beverage serving portion of the product in the third zone 4. The dispenser 5 can be a tap or faucet, which can be operated manually, or a dispensing device, which is operated by the control unit 16.

Figure 3:
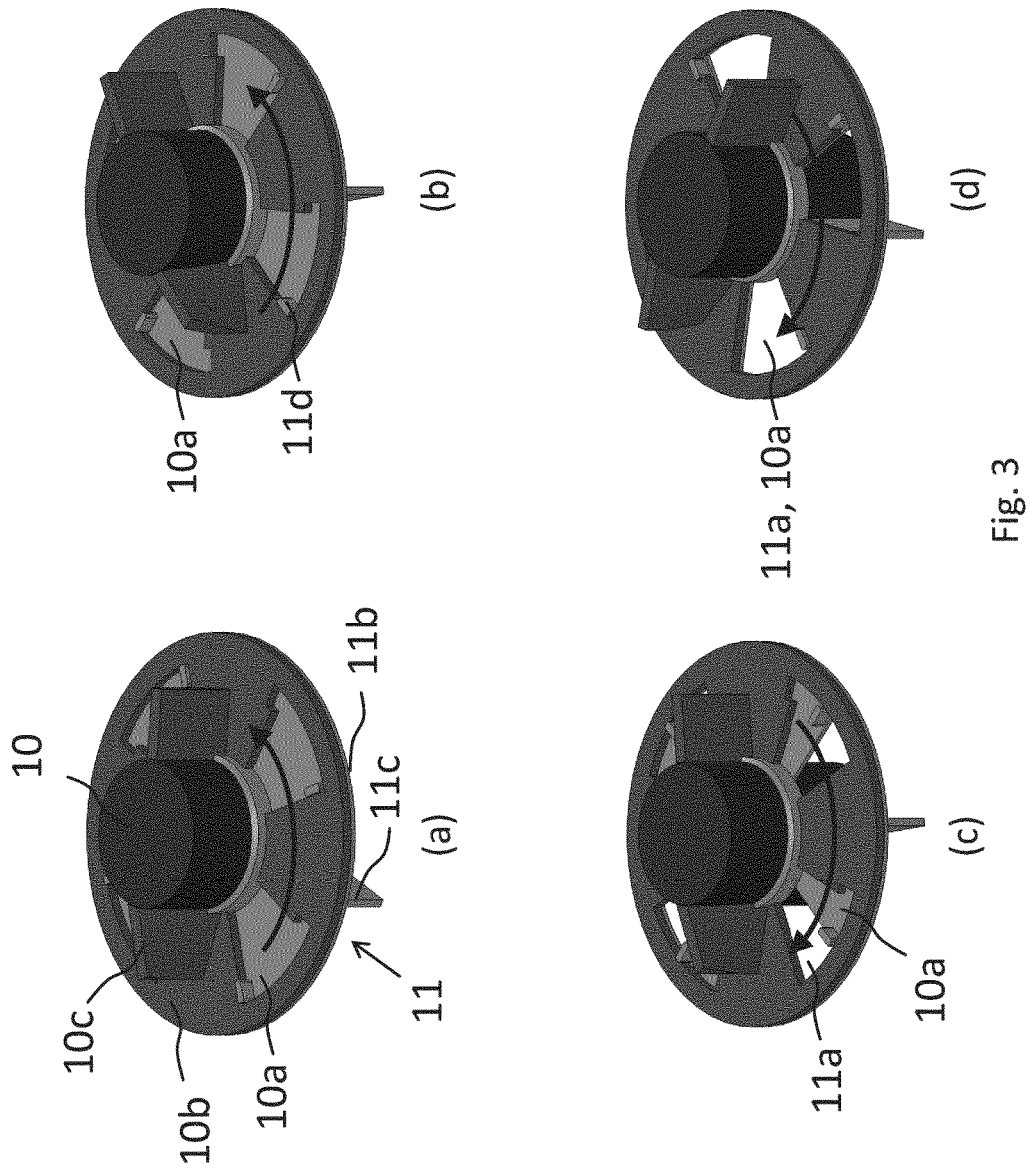
FIG. 3 shows a first and second stirrer according to the first aspect of the present invention.

FIG. 3 shows how the transfer of cooled liquid or semi-liquid product from the second zone 3 to the third zone 4 is realized in the first aspect by controlling only the rotational direction of the first stirrer 10. At least one opening 10a, 11a is provided on each stirrer 10, 11, preferably in the rotatable discs 10b, 11b. The at least one opening 10a of the first stirrer 10 and the at least one opening 11a of the second stirrer 11 are designed such, that depending on the orientation between the first 10 and the second stirrer 11 they can overlap partially or fully (i.e. their contours substantially match), but are spaced apart far enough so that they can also not overlap at all. The two stirrers 10 and 11 are rotatable around a common axis and are arranged such that their surfaces, preferably the surfaces of the rotatable discs 10b, 11b, which have the at least one opening 10a, 11a, face each other or even touch each other. Depending on the relative angle of rotation between the first stirrer 10 and the second stirrer 1, the at least one opening 10a of the first stirrer either overlaps partially, fully or not at all with the at least one opening 11a of the second stirrer 11.

The second stirrer 11 is further equipped with at least one mechanical stop 11d as illustrated in FIG. 3. The at least one mechanical stop 11d is preferably designed as a protrusion from the rotatable disc 11b of the second stirrer 11, protruding in the opposite direction as the wing-like structure 11c, i.e. towards the first stirrer 10. The at least one mechanical stop 11d protrudes through at least one opening 10a of the first stirrer 10. If the first stirrer 10 moves relative to the second stirrer 11, the at least one mechanical stop 11d moves within the at least one opening 10a, until it is blocked either on a first or a second side of the at least one opening 10a depending on a rotation direction of the first stirrer 10. As soon as the mechanical stop 11d is blocked, the second stirrer 11 moves according to the movement of the first stirrer 10. Therefore, only the first stirrer 10 has to be driven by the electromagnetic motor 13.

In FIGS. 3(a) and (b), the first stirrer 10 is driven in the counter-clockwise direction (indicated by the arrow) by the electromagnetic motor 13, whereby a transfer of the product from the second zone 3 to the third zone 4 is prohibited, since the at least one opening 10a and the at least one opening 11a do not overlap at all.

In FIGS. 3(c) and 3(d) the first stirrer 10 is rotated in a clockwise direction (indicated by the arrow), whereby the at least one opening 10a and the at least one opening 11a overlap fully (note that in initially, when the rotation begins, the openings overlap partly, until the at least one mechanical stop 11d is blocked). The mechanical stop 11b when blocked is disposed in a specifically designed cut out on the side of the at least one opening 10a. Thereby, the transfer path between the second zone 3 and the third zone 4 is opened and liquid or semi-liquid product can be transferred.

Discrete processing is realized in the beverage machine according to the first aspect by the following discrete steps.

Initially the second zone 3 is filled with a predefined volume of liquid or semi-liquid product, which has ambient temperature. The first stirrer 10 rotates the liquid or semi-liquid product to achieve a homogenized transmission of the cold from the cooling surface 8a to the product, and to scrape off any product freezing on the cooling cylinder 8. When the product has been successfully cooled and is at its predetermined serving temperature, the entire volume of the second zone 3 is transferred to the third zone 4. The transfer is performed as described before, namely by reversing the stirring direction of the first stirrer 10 arranged in the second zone 3.

Figure 4:
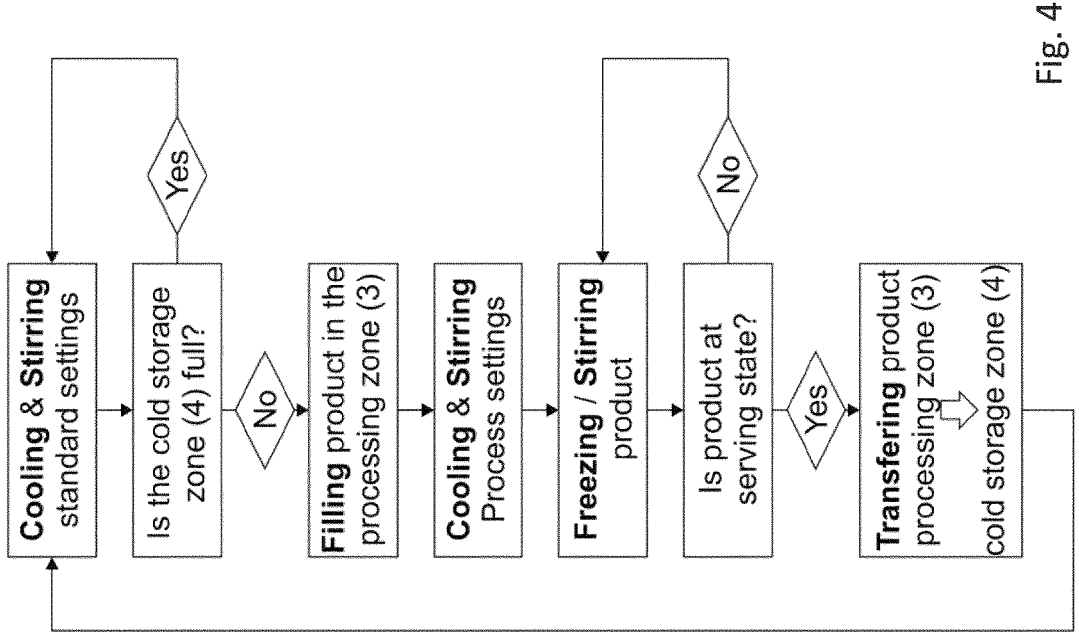
FIG. 4 shows a beverage machine according to a second aspect of the present invention.

Further, the method preferably also performs the steps shown in FIG. 4. The beverage machine uses the level sensor 5 to make a determination, whether the third zone 4 is filled with liquid or semi-liquid product or not, i.e. whether the product exceeds a predetermined threshold value or not. If the determination is positive, and the product in the third zone 4 exceeds the predetermined threshold value, the product is cooled and stirred in the third zone 4 using standard settings. The standard settings can for example be a predetermined rotation of the first stirrer 10 and a predetermined cooling power of the first cooling surface 8a. The rotation direction is counter-clockwise so that the product is not transferred from the second zone 3 to the third zone 4.

If the beverage machine determines that the third zone 4 is not full, i.e. the filling level is below the predetermined threshold value, a filling procedure is started, in order to transfer a portion of the product from the first zone 1 to the second zone 3. The product is subsequently cooled and stirred in the second zone 3 using processing settings. The processing settings can define a predetermined rotational speed and cooling power different from the standard settings. The first stirrer 10 should still be rotated counter-clockwise, until the predetermined serving temperature is reached. When the monitoring of the temperature in the second zone 3 indicates that the temperature of the product has reached the predetermined serving temperature, the transfer process to the third zone 4 is initiated. To this end, for example the rotation direction of the first stirrer 10 can be reversed. Once the third zone 4 is determined to be full, the method returns to cooling and stirring using again the standard settings.

Figure 5:
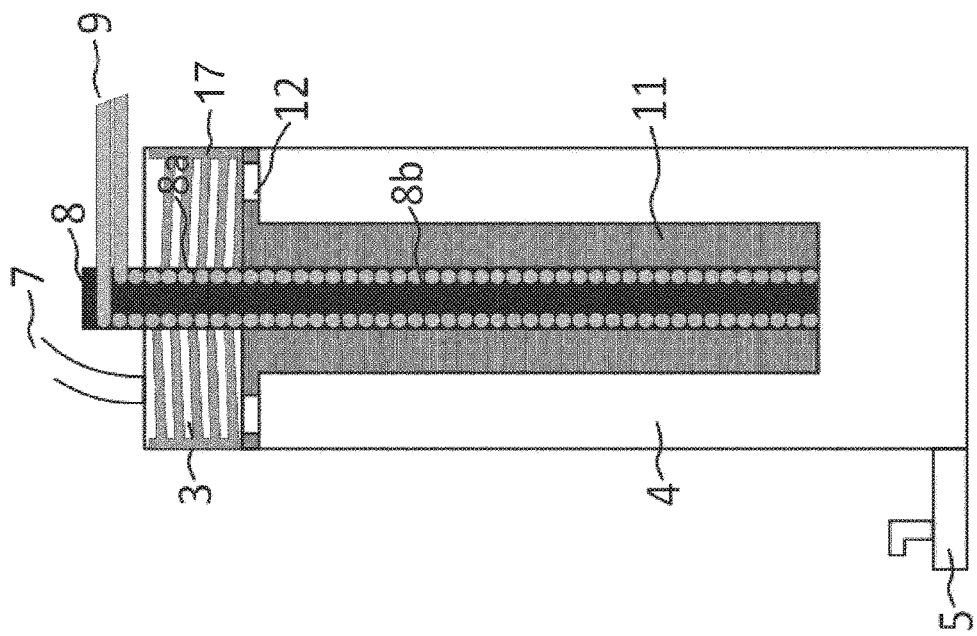
FIGS. 5a and 5b show a method according to the first and second aspect of the present invention, respectively.

FIG. 5 shows a beverage machine suitable for continuous processing according to a second aspect of the present invention.

The third zone 3 comprises the cooled surface 8a of the cooling cylinder 8 as in the first aspect. Instead of the first stirrer 10 the second zone 3 is equipped with a rotating screw 17. The rotating screw 17 can be rotated for progressively passing a portion of liquid product that is entered from the first zone 1 through the second zone 3. The third zone 4 has a stirrer 11, which has at least one opening 12, through which the portion of liquid product, which has progressed through the rotating screw 17, can enter the third zone 4.

For the continuous processing a defined flow rate of the liquid or semi-liquid product is set to continuously dispense the product from the first zone 1 at ambient temperature through the conduct 7. Preferably, the conduct is part of the pouch of the first zone 1. The liquid product enters the second zone 3 at the top of the rotating screw 17, which faces the first zone 1, and progressively passes through the rotating screw 17, whereby it is put in contact with the first cooling surface 8a, until it reaches the bottom of the rotating screw 17, which faces the third zone 4.

The cooling power of the first cooled surface 8a, the flow rate from the first zone 1 (e.g. defined by a pump rate of the pump 2), and the rotational speed of the rotating screw 17 can be set by the user. Said parameters can also be set automatically by the control unit 16. Preferably said parameters are set such that when the liquid or semi-liquid product arrives at the bottom of the rotating screw 17 (i.e. at the inlet of the third zone 4) it has been successfully cooled to the predetermined serving temperature. In this way the liquid or semi-liquid product can be transferred through the openings 12 into the third zone 4, without increasing the temperature of liquid product, which is already stored at the predetermined serving temperature in the third zone 4. The control unit 16 can monitor the temperature at the bottom of the second zone 3, and can automatically adapt the above-mentioned parameters.

Figure 6:
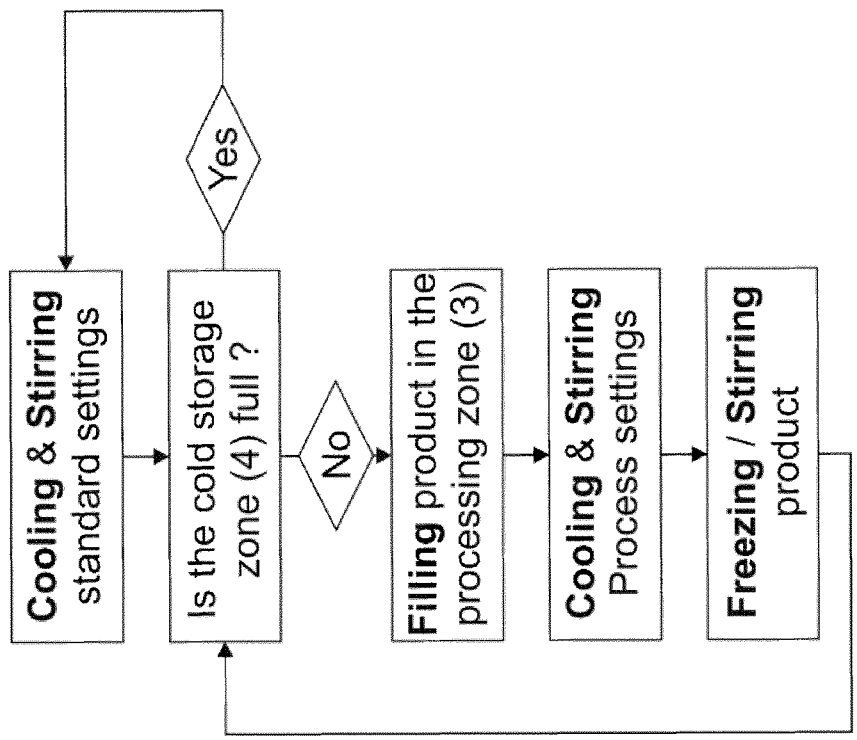

The continuous method used in the beverage machine in particular performs the steps shown in FIG. 6. The beverage machine uses the level sensor 5 to make a determination, whether the liquid product in third zone 4 exceeds a predetermined filling level or not. In case it is determined that the third zone 4 is full, i.e. the filling level exceeds the predetermined threshold, the liquid or semi-liquid product therein is cooled and stirred using the standard setting. If the product in the third zone 4 falls below the threshold value, i.e. the third zone 4 is not full anymore, a filling process of the product into the second zone 3 is initiated. The product from the first zone 1, which is at ambient temperature, is transferred, preferably by the pump 2, into the second zone 3. In the second zone 3 the portion of the product is cooled and stirred with the process settings. When the liquid product has reached the bottom of the rotating screw 17, the predetermined serving temperature is reached. The predetermined serving temperature at the bottom of the rotating screw 17 can further be monitored, and an automatic adaption of the above-mentioned parameters can be carried out by the computing unit 16. A feedback loop to the cooling circuit 14 can be established.

If the level sensor 5 in the third zone 4 measures that the product exceeds the predetermined threshold value of the filling level, the filling process into the second zone 3 is stopped so that the product stops progressing through the rotating screw 17. The process returns to cooling and stirring the product in the third zone 4 with the standard settings.

In summary the present invention provides a beverage machine with at least three distinct zones 1, 3, 4. A first zone 1 for storing a liquid or semi-liquid product at ambient temperature, a second zone 3 for processing the product, in particular cooling the product to a predetermined serving temperature, and a third zone 4 for storing the cooled product and maintaining it at the predetermined serving temperature. From the third zone 4 an iced beverage can be dispensed.

The beverage machine can be used with a shelf-stable initial product contained within the first zone 1, can achieve a reduced beverage preparation time due to the small volume of the second zone 3, requires no initial waiting time, since an unfrozen product can be used as the initial liquid or semi-liquid product, exhibits lower power consumption, since a smaller amount of the product has to be cooled at the same time, and allows for a reduced volume and fewer parts that have to be cleaned. Therefore, the beverage machine of the present invention is a significant improvement over the prior art.

The invention claimed is:

1. A beverage machine for preparing and dispensing an iced beverage made of a liquid or semi-liquid product, the beverage machine comprising:
   a first zone for storing the liquid or semi-liquid product at an ambient temperature;
   a second zone for receiving a portion of the liquid or semi-liquid product stored in the first zone and for cooling the portion from the ambient temperature to a predetermined serving temperature, the second zone comprises a first stirrer for stirring the portion of the liquid or semi-liquid product and a first cooled surface for cooling the portion of the liquid or semi-liquid product to the predetermined serving temperature;
   a third zone for receiving the cooled portion of the liquid or semi-liquid product from the second zone and for storing the liquid or semi-liquid product at the predetermined serving temperature, the third zone comprises a second stirrer for stirring the liquid or semi-liquid product, and a second cooled surface for maintaining the liquid or semi-liquid product at the predetermined serving temperature, the first stirrer and the second stirrer each have at least one opening,
   for at least one predetermined relative orientation between the first stirrer and the second stirrer, the at least one opening of the first stirrer overlaps with the at least one opening of the second stirrer to allow a transfer of the liquid or semi-liquid product from the second zone to the third zone,
   the second stirrer comprises at least one mechanical stop, which protrudes through the at least one opening of the first stirrer;
   if the first stirrer is rotated clockwise, the at least one mechanical stop is blocked on a first side of the at least one opening of the first stirrer, so that the first stirrer and the second stirrer have a relative orientation to each other, in which the at least one opening of the first stirrer completely overlaps with the at least one opening of the second stirrer; and if the first stirrer is rotated counter-clockwise, the at least one mechanical stop is blocked on a second side of the at least one opening of the first stirrer, so that the first stirrer and the second stirrer have a relative orientation to each other, in which the at least one opening of the first stirrer does not overlap with the at least one opening of the second stirrer.

2. A method for preparing and dispensing an iced beverage made of a liquid or semi-liquid product, the method comprising:

storing the liquid or semi-liquid product at an ambient temperature in a first zone;

cooling a portion of the liquid or semi-liquid product received from the first zone from the ambient temperature to a predetermined serving temperature in a second zone; and storing the cooled portion of the liquid or semi-liquid product received from the second zone at the predetermined serving temperature in a third zone;

determining a filling level of the liquid or semi-liquid product in the third zone; and in case the filling level is below a predetermined threshold, transferring the portion of the liquid or semi-liquid product from the first zone to the second zone;

stirring and cooling the portion of the liquid or semi-liquid product to the predetermined serving temperature using predetermined process settings in the second zone;

in case the filling level is at or above the predetermined threshold, maintaining the cooled liquid or semi-liquid product in the third zone at the predetermined serving temperature by stirring and cooling using predetermined standard settings.

3. The method according to claim 2, comprising:

in case the filling level is below a predetermined threshold, monitoring a temperature of the liquid or semi-liquid product in the second zone; and transferring the liquid or semi-liquid product from the second zone to the third zone.

* * * * *